United States Patent [19]

Brown

[11] 4,276,821

[45] Jul. 7, 1981

[54] BUTTER MELTER DEVICE FOR TOASTER

[76] Inventor: John B. Brown, Rte. 2, Box 85, Colerain, N.C. 27924

[21] Appl. No.: 109,849

[22] Filed: Jan. 7, 1980

[51] Int. Cl.³ .............................................. A47J 37/08
[52] U.S. Cl. ........................................ 99/339; 30/327; 99/352; 248/206 A
[58] Field of Search ................ 99/339, 340, 357, 385, 99/352; 248/206 A; 30/327

[56] References Cited

U.S. PATENT DOCUMENTS

| 2,521,855 | 9/1950 | Kodadek | 99/339 |
| 2,639,658 | 5/1953 | Biehls | 99/339 |
| 2,640,600 | 6/1953 | Farr | 99/339 |
| 2,693,751 | 11/1954 | Allen | 99/339 |
| 2,749,836 | 6/1956 | Wedge | 99/339 |
| 2,769,387 | 11/1956 | Penick | 99/339 |
| 2,847,930 | 8/1958 | Evans | 99/339 |
| 2,980,011 | 4/1961 | Delk | 99/339 |
| 2,995,983 | 8/1961 | Davis | 248/206 A |
| 3,866,525 | 2/1975 | Oxel | 99/339 |

*Primary Examiner*—Billy J. Wilhite
*Attorney, Agent, or Firm*—B. B. Olive

[57] ABSTRACT

A device for melting butter provides a support member which is detachably secured to a pop-up type toaster and in turn detachably supports a butter melting ladle such that heat rising from the toaster can be utilized to melt the butter.

5 Claims, 6 Drawing Figures

BUTTER MELTER DEVICE FOR TOASTER

BACKGROUND OF THE INVENTION

1. Field of the Invention

The present invention relates to pop-up type toasters for toasting bread slices and particularly to devices which can be attached to a conventional pop-up type toaster so that the toaster may perform an additional function when electrically energized.

2. Description of the Prior Art

Typically, heat rising from a pop-up type toaster during the toasting process is wasted and serves no particular function. Sometime previously toasted bread slices are warmed up supporting the slices on top of the toaster energized. U.S. Pat. No. 3,866,525 provides a warming rack disposed above the toaster. However, so far as applicant is aware no one previously has provided a device for use in conjunction with an electric pop-up type bread toaster and is uniquely adapted for melting butter while the toasting operation is being performed.

SUMMARY OF THE INVENTION

The invention provides a device which can be detachably secured to a pop-up type toaster specifically for the purpose of melting butter utilizing heat rising from the toaster when the toaster is energized. The invention device comprises a detachable support member which can be detachably secured to the top of the toaster and a ladle which can be removably supported on the support member while the toaster is energized such that heat rising from the toaster during the toasting process is directed to the ladle and melts the butter contained in the ladle. In a preferred embodiment, the invention recognizes that toaster housings are normally made of ferromagnetic material and a magnet is mounted in the base of the support member for securing the support member to the toaster housing. Other means for detachably securing the ladle support member to the toaster housing are also disclosed.

DESCRIPTION OF THE PREFERRED EMBODIMENT

Figure 1:
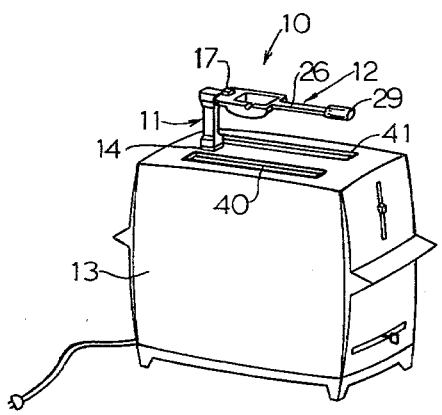
FIG. 1 is a pictorial view of a conventional pop-up type bread slice toaster with a magnetically secured ladle support and ladle according to a first embodiment of the invention.

Making reference initially to FIGS. 1-4, the device 10 of the invention comprises an upright ladle support 11 and a removable ladle 12. Toaster 13 represents a conventional pop-up type toaster typically having a housing formed of steel or like material. Taking advantage of this characteristic, support member 11 is magnetically secured to the top of toaster 13 by a suitable magnet 14 integrally secured to the base of support member 11. The ladle support is provided with an integral leg 15 which extends outwardly from support 11 and has an integral upright member 16, a rearwardly disposed lip 17 and cantilever support structure 18.

Figure 3:
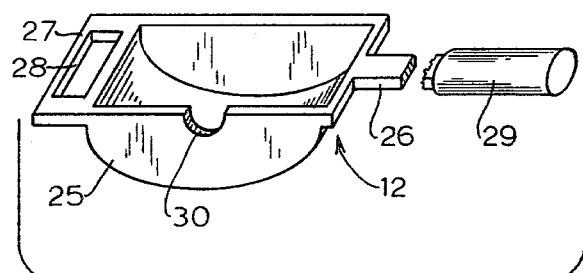
FIG. 3 is a larger pictorial view of the ladle illustrated in FIG. 1.
Figure 4:
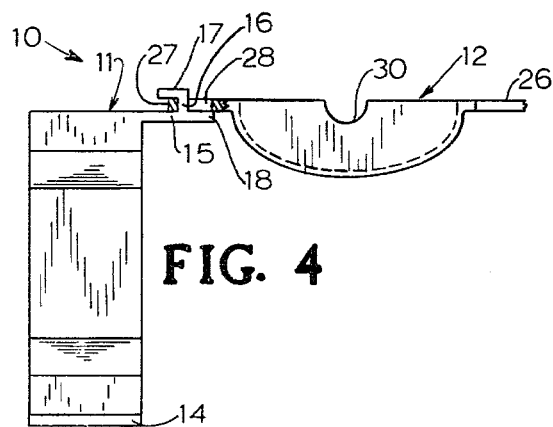
FIG. 4 is a side elevation view of the ladle support and ladle of FIGS. 2 and 3 showing the working relation and with a portion of the ladle broken away to illustrate how the ladle is removably mounted on the support.

The ladle 12 in which the butter is to be melted is composed of a spoon portion 25 and a handle portion 26. Lip 27, as best seen in FIG. 3, has an elongated opening 28 which mates with and receives the previously-mentioned lip 17 of the ladle support 11. Lip 27 and opening 28 provide a snug sliding fit for receiving lip 17 of support 11 and providing a useful supportive connection for ladle 12. Once lip 17 passes through opening 28, ladle 12 is slid forward so that lip 27 resides beneath lip 17 and on top of leg 15. Support structure 18 support the portion of lip 27 adjacent spoon portion 25. The weight of the elongated handle 26 and heat insulator 29 mounted on handle 26 assist in maintaining the ladle properly positioned in service. It will also be noted that spoon portion 25 is provided with a pour spout 30 which allows for side tilting of ladle 12 and pouring of the melted butter therefrom. To assist in the melting process, spoon portion 25 is preferably formed of relatively thin, highly heat conductive material such as aluminum.

Once support 11 is positioned on toaster 13 between slots 40, 41, ladle 12 is placed on support 11 by means of lip 17 and slot 28. Unmelted butter is placed in spoon portion 25 and the bread slices are placed in slots 40, 41 and lowered into toaster 13. As toaster 13 toasts the bread slices in the conventional manner, a substantial amount of heat will rise and exit toaster 13 through slots 40, 41. Advantage is taken of this fact by allowing such heat to rise and be directed beneath and around the spoon portion 25 of ladle 12 so as to melt the butter in the heat conductive spoon 25. Thus, with the device 10 of the invention, once the bread has been toasted, melted butter will also be available in spoon 25 for buttering the bread. Although not shown, a suitable brush or other spreading device could, of course, be incorporated in the structure of ladle 12 and used in spreading the melted butter, margerine or other melted substance.

Figure 5:
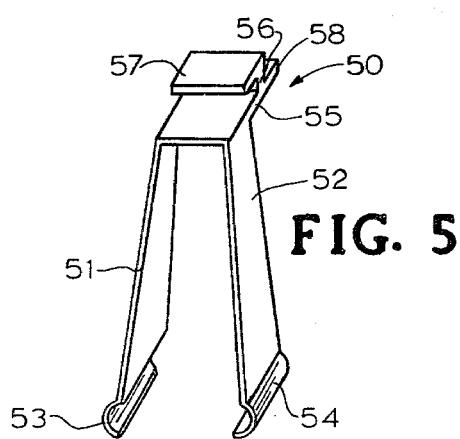
FIG. 5 is a pictorial view of a second embodiment ladle support adapted to be used with the ladle of FIG. 3.

FIG. 5 discloses in a second embodiment an alternative form of ladle support 50. Ladle support 50 is made in the form of a pair of resilient leg members 51, 52 wth rounded ends 53, 54. In use, leg members 51, 52 are spread apart and the ends 53, 54 are mounted over the adjacent innermost edges of slots 40, 41 of toaster 13 in a clamping relation so that support 50 will be positioned vertically above toaster 13 and between the slots 40, 41. An integral leg 55, corresponding to leg 15 of FIG. 2, extends outwardly from support 50 and has an upright member 56, corresponding to member 16 of FIG. 2, extending upwardly from leg 55, a rearwardly disposed lip 57 and cantilever support structure 58. With the explanation previously given, it will, or course, be understood that ladle 12 utilizing slot 28 can be mounted on lip 57 of support 50 in the same manner as previously explained with regard to the first embodiment ladle support 11.

Figure 6:
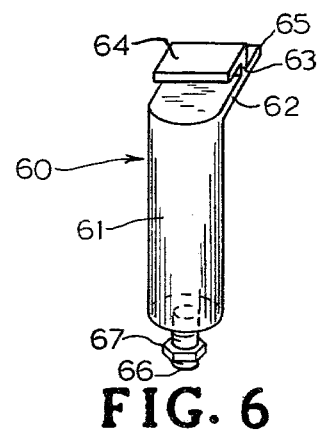
FIG. 6 is a pictorial view of a third embodiment of the ladle support adapted to be used with the ladle of FIG. 3.
Figure 2:
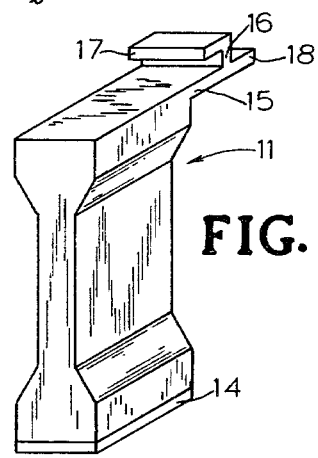
FIG. 2 is a larger pictorial view of the magnetically secured ladle support illustrated in FIG. 1.

FIG. 6 discloses a third embodiment ladle support 60. Ladle support 60 is formed with a cylindrical shaft 61 having a lip 64, an extension 62, upright member 63, and cantilever member 65. Threaded post 66 extends from the base of ladle support 60 and utilizing a threaded nut 67 may be physically secured in a suitable hole formed between the slots 40, 41 of toaster 13. In use, the ladle 12 mounts on support 60 in the same manner previously explained with regard to the first embodiment ladle support 11 and the second embodiment ladle support 50. In this third embodiment of the invention, it will, of course, be appreciated that a more permanent form of ladle support is provided such as may be required in restaurants and other commercial food operations. Also, to be noted is that pop-up type toasters are available as single slice, two slice, three slice or four slice types. Thus, the number of the openings may vary. However, the invention attachment is readily adapted to any such types.

What is claimed is:

1. An attachment for an electrically heated pop-up type toaster having a housing enclosing a toasting chamber and at least one opening in the top of the housing through which a bread slice or the like may be inserted into and removed from said toasing chamber, said attachment comprising:
   (a) an upright support member detachably securable to said toaster housing and providing a support structure having a cantilevered arm with an upright member and a lip portion thereon elevated above the top of said housing: and
   (b) a ladle adapted to be removably supported on said support structure above said housing opening and having a heat conductive receptacle portion for receiving and melting butter or the like therein, said receptacle portion having an opening adapted to be releasably fitted over said lip portion for holding said ladle during the melting of said butter or the like and integral therewith a handle portion such that when said ladle is mounted on said support structure above said toaster housing opening and said toaster is energized said butter or the like may be melted in said receptacle portion by utilizing heat rising from said housing opening.

2. An attachment as claimed in claim 1 wherein said housing is formed of a ferromagnetic material and said upright support member includes a magnet in a base portion thereof enabling said support member to be removably secured to said housing by utilizing the magnetic attraction of said magnet for said housing.

3. The attachment of claim 1 wherein said support member includes a pair of resilient leg members adapted to resiliently clamp a selected portion of said toaster housing and said support structure is elevated above said leg members.

4. The attachment of claim 1 wherein said support member includes a base portion with a threaded rod-nut arrangement for securing said base portion to the top of said housing.

5. The attachment of claim 1 where said housing has a plurality of said openings and said support member has a base portion adapted to resiliently engage selected surfaces of said housing adjacent said openings.

* * * * *